United States Patent [19]
Robinson

[11] Patent Number: 5,813,725
[45] Date of Patent: Sep. 29, 1998

[54] ROTARY GEAR LOCK SEAT RECLINER

[75] Inventor: David L. Robinson, Sterling Heights, Mich.

[73] Assignee: Fisher Dynamics Corporation, St. Clair Shores, Mich.

[21] Appl. No.: 923,887

[22] Filed: Sep. 4, 1997

[51] Int. Cl.⁶ ..................................................... B60N 2/02
[52] U.S. Cl. .......................................... 297/367; 297/362
[58] Field of Search .............................. 297/354.12, 362, 297/367, 361.1, 378.1, 378.12, 368, 369, 370, 371

[56] References Cited

U.S. PATENT DOCUMENTS

| | | | |
|---|---|---|---|
| 4,294,488 | 10/1981 | Pickles | 297/367 |
| 4,372,610 | 2/1983 | Fisher, III et al. . | |
| 4,684,174 | 8/1987 | Bell . | |
| 4,685,736 | 8/1987 | Tanaka et al. | 297/367 X |
| 4,705,319 | 11/1987 | Bell . | |
| 4,720,144 | 1/1988 | Heesch | 297/362 |
| 4,720,145 | 1/1988 | Bell . | |
| 4,733,912 | 3/1988 | Secord . | |
| 4,747,641 | 5/1988 | Bell . | |
| 4,795,213 | 1/1989 | Bell . | |
| 4,822,100 | 4/1989 | Bell . | |
| 4,929,024 | 5/1990 | Secord . | |
| 4,946,223 | 8/1990 | Croft et al. | 297/362 |
| 5,205,609 | 4/1993 | Notta et al. | 297/367 |
| 5,590,932 | 1/1997 | Olivieri . | |

*Primary Examiner*—Milton Nelson, Jr.
*Attorney, Agent, or Firm*—Harness, Dickey & Pierce, P.L.C.

[57] ABSTRACT

A seat recliner for adjusting the angular position of a seatback relative to a seat bottom. The seat recliner includes a first member secured to the seat bottom, a second member secured to the seatback and supported for pivotal movement relative to the first member, and a latching mechanism operable in a latched mode for inhibiting pivotal movement of the second member relative to the first member and in an unlatched mode for permitting pivotal movement of the second member. The latching mechanism includes a first gear non-rotatably fixed to the second member, a second gear rotatably supported from the first member and in constant meshed engagement with the first gear, and a third gear in constant meshed engagement with the first gear. A recline actuator mechanism shifts the latching mechanism from the latched mode into the unlatched mode by moving the third gear from a first position whereat it is also meshed with the second gear to a second position whereat it is released from meshed engagement with the second gear.

27 Claims, 5 Drawing Sheets

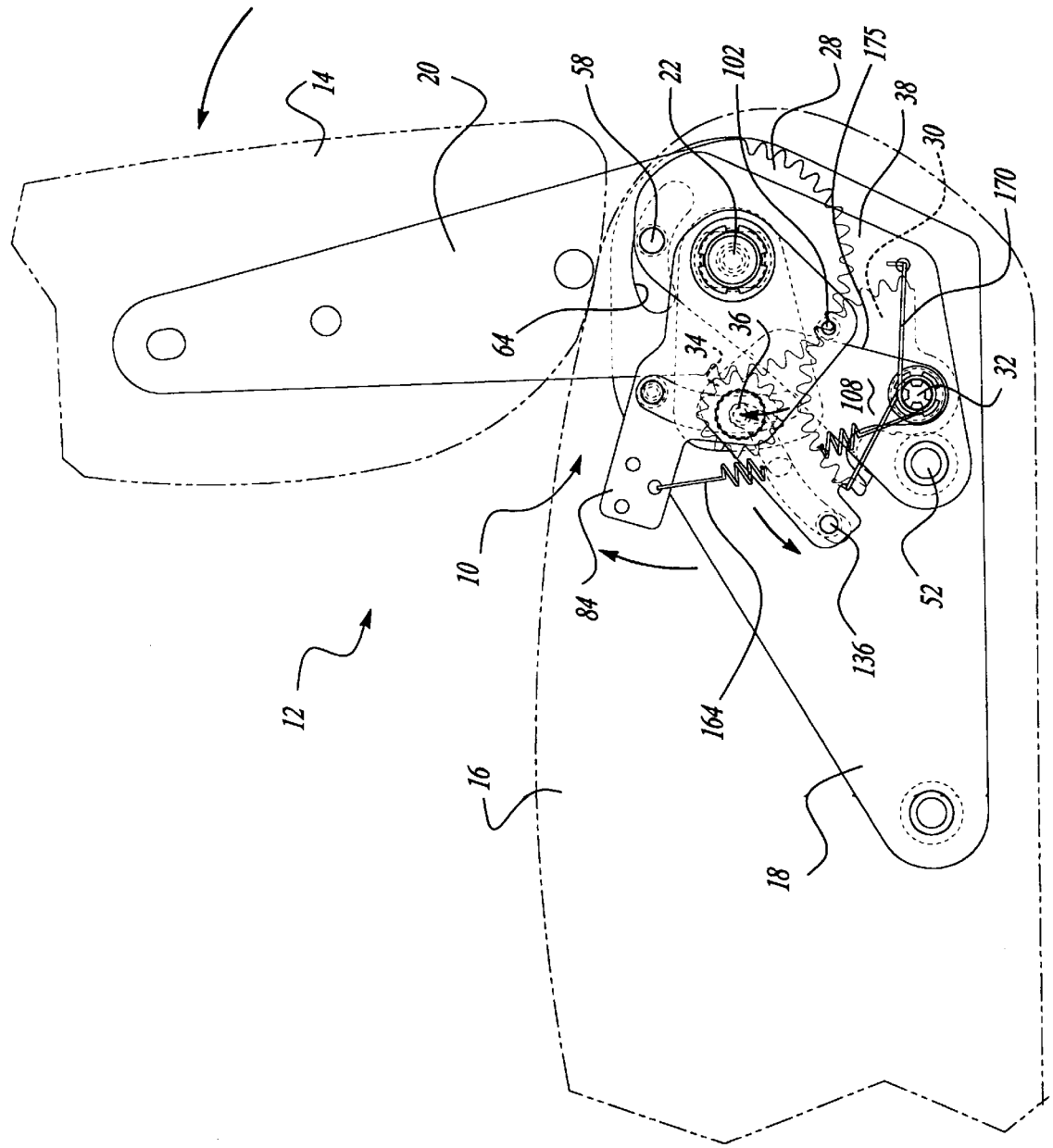

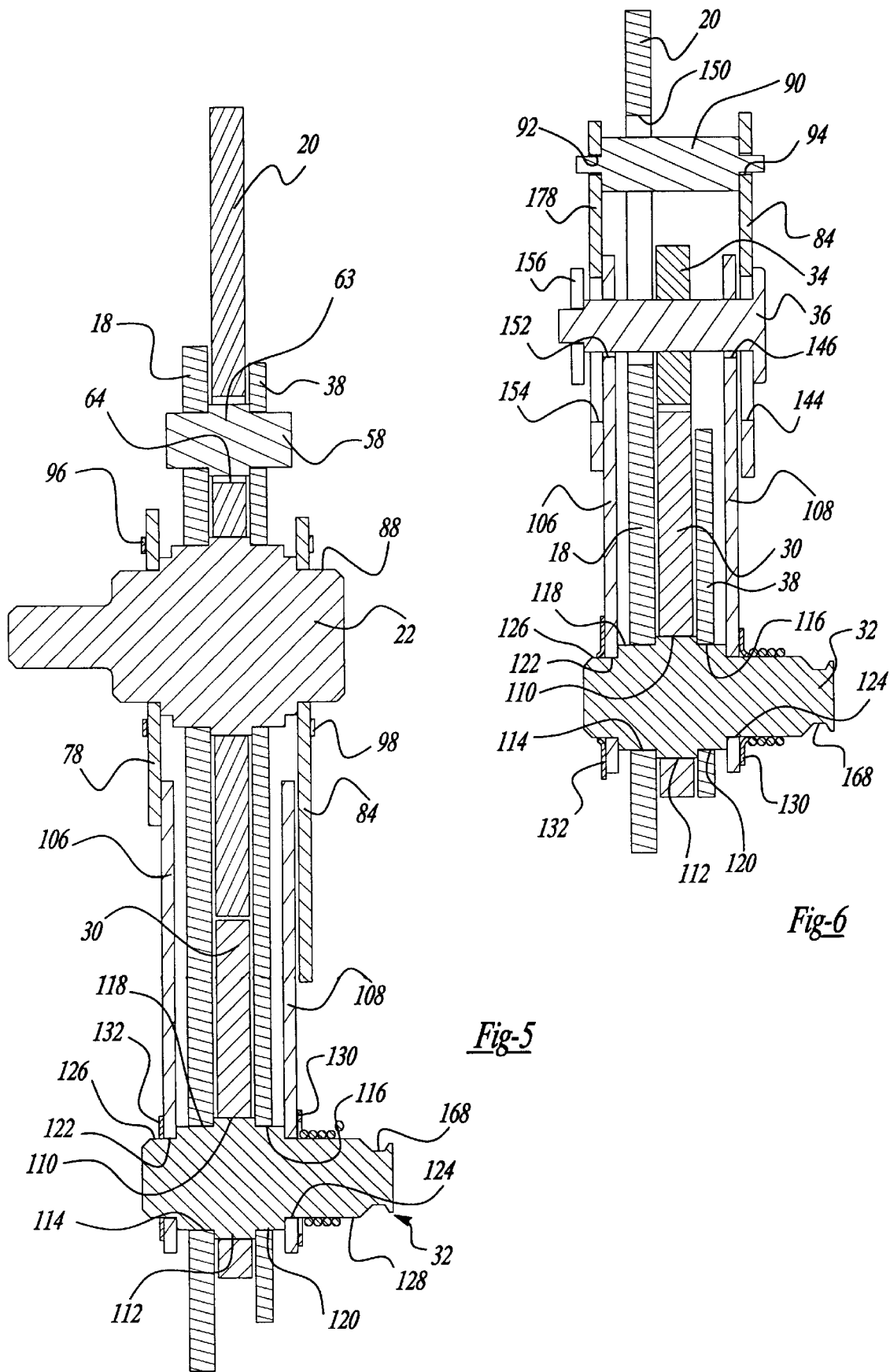

ROTARY GEAR LOCK SEAT RECLINER

BACKGROUND OF THE INVENTION

1. Field of the Invention

This invention relates generally to reclining seats for use in motor vehicles. More particularly, the present invention is directed to a seat recliner equipped with a geared latching mechanism which can be selectively actuated to permit the seat occupant to adjust the reclined position of the seatback relative to the seat bottom.

2. Discussion

Virtually all passenger-type motor vehicles are now equipped with front seat assemblies having a seat recliner that can be selectively actuated for permitting the seat occupant to adjust the angularity of the seatback relative to the seat bottom between a full forward position and a full recline position. As is conventional, seat recliners include a latching mechanism which can be selectively released, either manually through a recliner handle or via actuation of a power-operated actuator, when it is desired to adjust the angular position of the seatback. Various examples of manual seat recliners are shown in commonly-owned U.S. Pat. Nos. 5,590,932; 4,822,100; 4,795,213; 4,747,641; 4,733,912; 4,720,145; 4,705,319; 4,684,174; and 4,372,610. Additionally, an exemplary power seat recliner is shown in commonly-owned U.S. Pat. No. 4,929,024.

Despite the plethora of different seat recliners taught by the above-noted patents, a continuing need exists to develop alternative seat recliners which advance the level of technology in a manner which reduces system complexity and cost while enhancing system reliability and durability.

SUMMARY OF THE INVENTION

Accordingly, it is an object of the present invention to provide a seat recliner for use in reclining seats which has a geared latching mechanism operable to permit selective adjustment of the reclined position of the seatback relative to the seat bottom.

According to a preferred construction, the seat recliner of the present invention includes a first member adapted for fixation to the seat bottom, a second member adapted for fixation to the seatback and which is supported for pivotal movement relative to the first member, and a latching mechanism which is normally operable in a latched mode for preventing movement of the second member to retain the seatback in a reclined position. The latching mechanism is also operable in an unlatched mode for permitting the second member to pivot relative to the first member through a predefined range of motion defined between the limits of a full forward position and a full recline position of the seatback. The latching mechanism includes a first gear non-rotatably fixed to the second member, a second gear rotatably supported on the first member and in constant mesh with the first gear, and a third gear in constant mesh with the first gear. The seat recliner further includes a recline actuator mechanism for selectively shifting the latching mechanism from its latched mode into its unlatched mode when it is desired to adjust the angular position of the seatback. The recline actuator mechanism is operable to move the third gear from a first position whereat it is also meshed with the second gear and a second position whereat it is displaced from meshed engagement with the second gear. In the first position, concurrent meshed engagement of the third gear with both of the first and second gears creates a gear lock therebetween preventing movement of the second member. In the second position, pivotal movement of the second member is permitted. The seat recliner also includes a biasing mechanism for normally urging the third gear toward its first position.

BRIEF DESCRIPTION OF THE DRAWINGS

The present invention will become more fully understood from the following detailed description when considered in conjunction with the accompanying drawings wherein:

FIG. 4 is a partial elevational view, similar to FIG. 1, showing the seat recliner with its latching mechanism operating in an unlatched mode to permit adjustment of the seatback's recliner position;

FIG. 5 is a partial sectional view taken generally along line 5—5 of FIG. 1; and FIG. 6 is another partial sectional view taken generally along line 6—6 of FIG. 1.

DESCRIPTION OF THE PREFERRED EMBODIMENT

Figure 1:
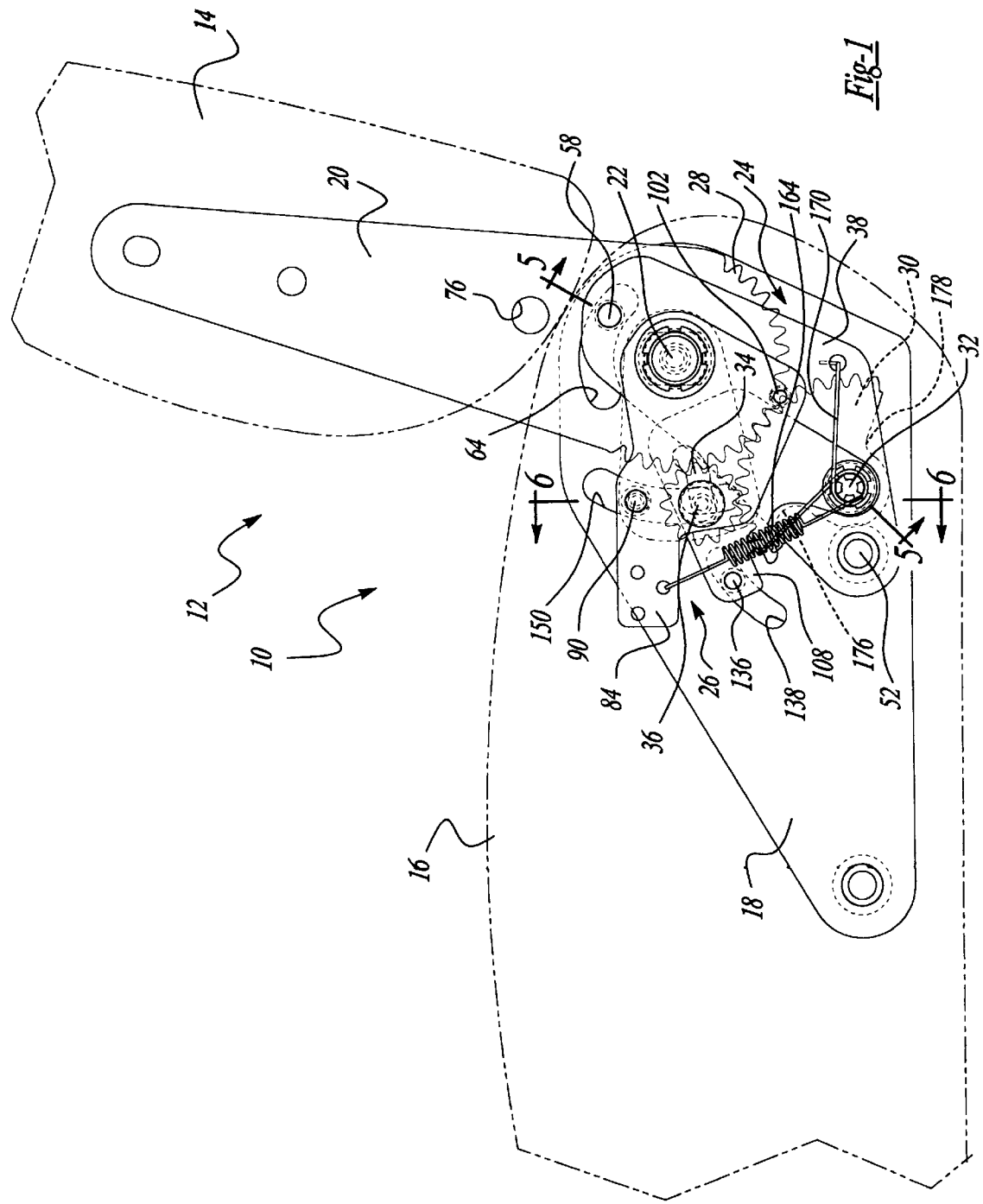
FIG. 1 a side elevational view of a seat recliner according to the present invention with its latching mechanism operating in a latched mode for retaining the seatback in a reclined position relative to the seat bottom.
Figure 2:
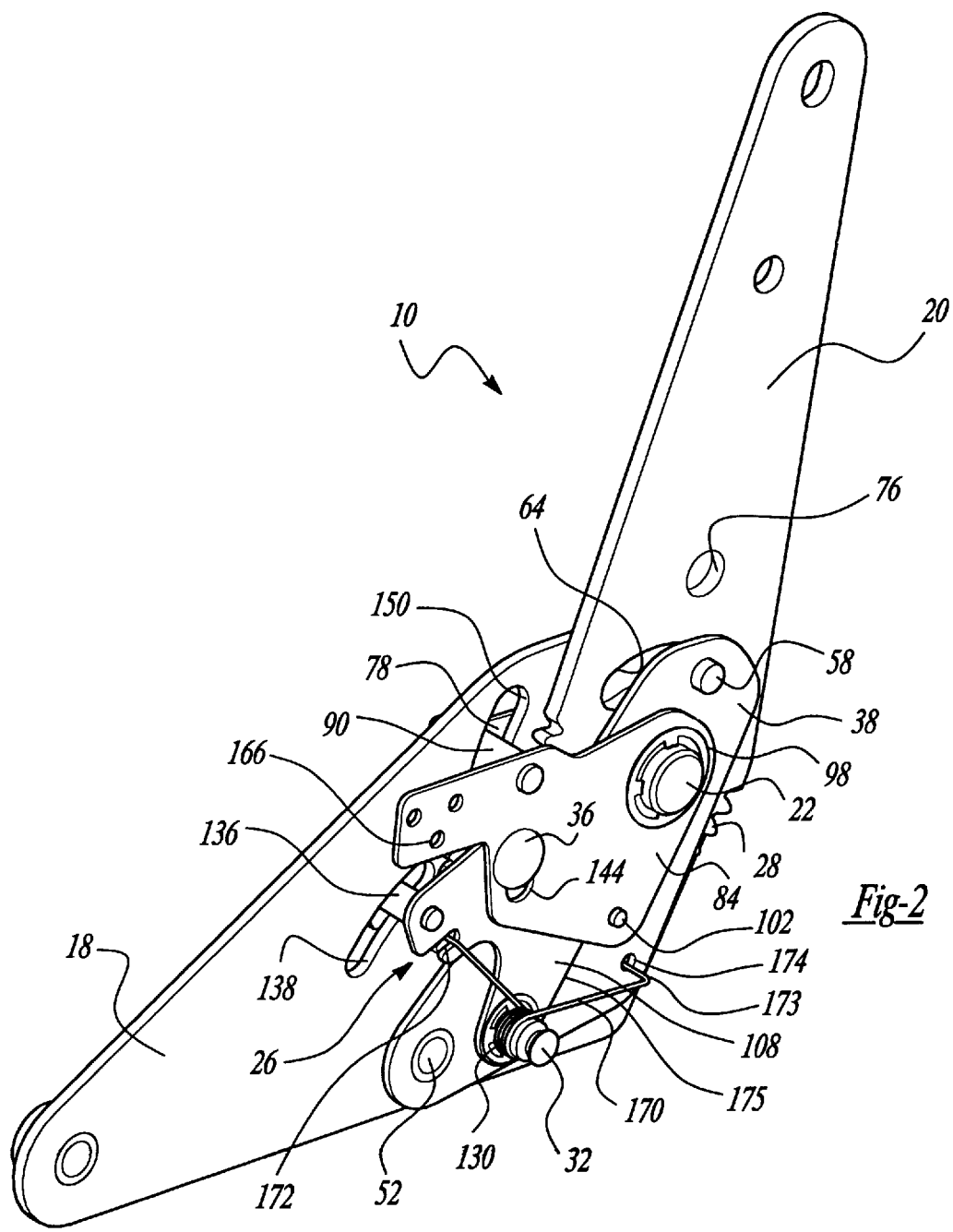
FIG. 2 is a perspective view of the seat recliner shown in FIG. 1.

The present invention relates to a seat recliner 10 adapted for incorporation into a seat assembly 12 having a seatback 14 and a seat bottom 16. While not limited thereto, seat assembly 12 is of a type particularly applicable for use as the front seat in passenger-type motor vehicles. Preferably, seat recliner 10 is located along the outboard lateral side of seat assembly 12 to permit convenient actuation and control of its reclining feature. In this regard, seat recliner 10 supports seatback 14 for pivotal (i.e., "reclining") movement relative to seat bottom 16 between a full forward position and a full recline position. In addition, seat recliner 10 is normally operable to retain seatback 14 in a selected reclined position and can be selectively actuated to permit adjustment of the reclined position.

Seat recliner 10 is a hinge assembly including a first or lower mounting plate 18 which is adapted to be secured to the frame structure of seat bottom 16, and a second or upper mounting plate 20 which is adapted to be secured to the frame structure of seatback 14. As shown, upper mounting plate 20 is journally mounted on a hinge pin 22 for angular pivotal movement with respect to lower mounting plate 18 about a first axis "A". Seat recliner 10 also includes a latching mechanism 24 which is normally operable for preventing angular movement of upper mounting plate 20 relative to lower mounting plate 18, thereby holding seatback 14 in a reclined position. In particular, latching mechanism 24 is normally operable in a "latched" mode for retaining upper mounting plate 20 in a selected angular position relative to lower mounting plate 18, thereby holding seatback 14 in a selected reclined position relative to seat bottom 16. Latching mechanism 24 is also operable in an "unlatched" mode for permitting upper mounting plate 20 to pivot on hinge pin 22 through a predetermined range of angular movement between the full forward and full recline positions of seatback 14. With latching mechanism 24 in its unlatched mode, seatback 14 can be moved toward its full forward position by pivoting upper mounting plate 20 in a first (i.e., counterclockwise) direction or, alternatively, toward its full recline position by pivoting upper mounting plate 20 in a second (i.e., clockwise) direction. Seat recliner 10 also includes a recline actuator mechanism 26 which is operable for permitting a seat occupant to selectively shift latching mechanism 24 from its latched mode into its unlatched mode when it is desired to adjust the reclined position of seatback 14. As will be described, a biasing mechanism is provided for automatically shifting latching mechanism 24 back into its latched mode upon release of recline actuator mechanism 26.

Latching mechanism 24 is a "gear lock" arrangement including three gear components. The second and third gear components are both in constant meshed engagement with the first gear component and the third gear component can be moved via recline actuator mechanism 26 between a first position and a second position. In the first position, the third gear component is also in meshed engagement with the second gear component. In contrast, with the third gear component in the second position, it is disengaged from meshed engagement with the second gear component. As such, latching mechanism 24 is defined as operating in its latched mode when the third gear component is in its first position and is defined as operating in its unlatched mode when the third gear component is in its second position. According to the embodiment shown, the first gear component is a quadrant gear 28 formed integrally on upper mounting plate 20, the second gear component is a positioning gear 30 journally supported on a pivot pin 32 for angular movement relative to lower mounting plate 18 about a second axis "B", and the third gear component is an idler gear 34 rotatably journalled on an idler pin 36. As will be detailed, recline actuator mechanism 26 is operable to move idler pin 36 for moving idler gear 34 between the first and second positions.

The teeth of quadrant gear 28 are in constant mesh with the teeth of positioning gear 30 and idler gear 34. When idler gear 34 is located in its first position, as shown in FIG. 1, its teeth also mesh with the teeth of positioning gear 30, thereby causing a gear lock which inhibits pivotal movement of quadrant gear 28 about hinge pin 22 and, in effect, inhibits pivotal movement of upper mounting plate 20 relative to lower mounting plate 18. However, movement of idler gear 34 to its second position, as shown in FIG. 4, results in the release of its teeth from meshed engagement with the teeth of positioning gear 32 while its teeth maintain meshed engagement with the teeth of quadrant gear 28, thereby releasing the gear lock and permitting subsequent pivotal movement of upper mounting plate 20 relative to lower mounting plate 18.

Figure 3:
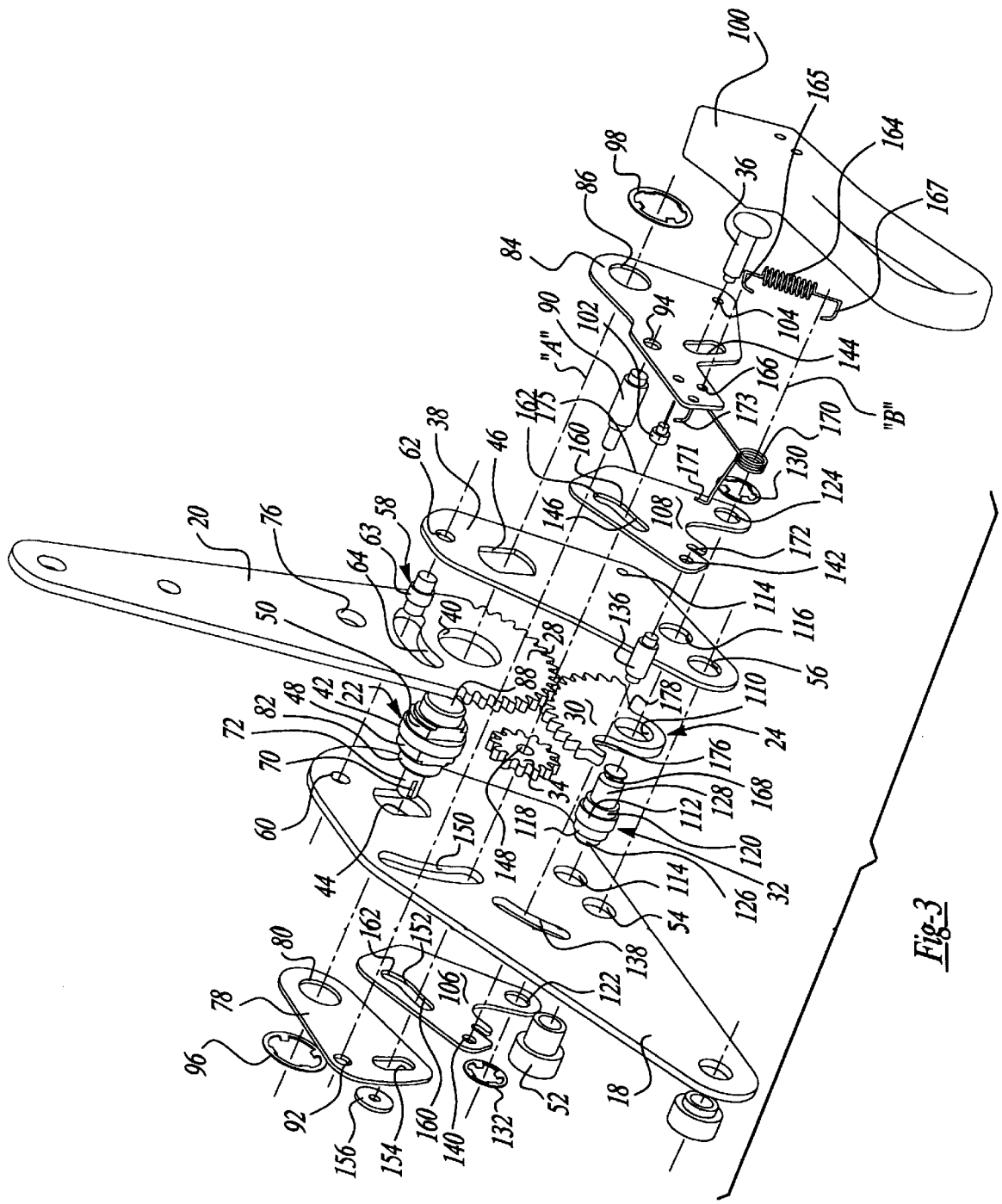
FIG. 3 is an exploded perspective view of the seat recliner shown in FIG. 2.

As best seen from FIGS. 3, 5 and 6, the three gear components are rotatably supported between lower mounting plate 18 and a fixture plate 38, with the components associated with recline actuator mechanism 26 assembled laterally outboard thereof. In particular, an aperture 40 formed in quadrant gear 28 is journalled on a segment 42 of hinge pin 22 while flat-sided apertures 44 and 46 formed respectively in lower mounting plate 18 and fixture plate 38 retain corresponding flat-sided key segments 48 and 50 of hinge pin 22. To secure fixture plate 38 to lower mounting plate 18, a spacer post 52 is shown to extend through a first pair of aligned apertures 54 and 56 while ends of a stop pin 58 are shown to extend through a second pair of aligned apertures 60 and 62. To define the limits of angular movement of upper mounting plate 20 relative to lower mounting plate 18, a central segment 63 of stop pin 58 extends through and rides in an arcuate guide slot 64 formed in upper mounting plate 18. The arc length of guide slot 64 is selected to define the limits of pivotal movement of seatback 14 between its full forward and full recline positions based on engagement of its end surfaces with central segment 63 of stop pin 58. As is conventional, a power spring (not shown) is provided to assist in returning seatback 14 to its full forward position. The power spring has a first end retained in a groove 70 formed in an end segment 72 of hinge pin 22 and a second end retained against a spring pin (not shown) extending outwardly from upper mounting plate 20 and which is retained in an aperture 76 formed therein. Thus, the power spring normally urges upper mounting plate 20 to rotate in the first direction about hinge pin 22.

According to the present invention, recline actuator mechanism 26 is operable to cause selective movement of idler gear 34 from its first position to its second position and also includes a biasing assembly for normally urging idler gear 34 toward its first position. Recline actuator mechanism 26 is shown to includes an inner idler plate 78 having an aperture 80 journalled on a segment 82 of hinge pin 22 and an outer idler plate 84 having an aperture 86 journalled on a segment 88 of hinge pin 22. Inner idler plate 78 and outer idler plate 84 are interconnected via a connector pin 90, the ends of which are retained in aligned apertures 92 and 94, for synchronous pivotal movement on hinge pin 22 about first axis "A". A first retainer ring 96 is adapted to be mounted on segment 82 of hinge pin 22 adjacent to inner idler plate 78 while a second retainer ring 98 is mounted on segment 88 of hinge pin 22 adjacent to outer idler plate 84. Recline actuator mechanism 26 also includes a recliner handle 100 which is fixed to outer idler plate 84 for permitting the seat occupant to selectively rotate idler plates 78 and 84 about hinge pin 22. In addition, a striker pin 102 extends from outer idler plate 84 and has a portion retained in an aperture 104 formed therein.

Recline actuator mechanism 26 further includes an inner cam plate 106 and an outer cam plate 108. Inner cam plate 106 is located between inner idler plate 78 and lower mounting plate 18 while outer cam plate 108 is located between outer idler plate 84 and fixture plate 38. As best seen from FIG. 3, an aperture 110 in positioning gear 30 is journalled on a segment 112 of pivot pin 32, an aperture 114 in lower mounting plate 18 and an aperture 116 in fixture plate 38 are journalled on corresponding segments 118 and 120 of pivot pin 32, and apertures 122 and 124 respectively formed in cam plates 106 and 108 are journalled on corresponding segments 126 and 128 of pivot pin 32. A retainer ring 130 is secured on segment 128 of pivot pin 32 while a retainer ring 132 is retained on segment 126 of pivot pin 32. Additionally, a guide pin 136 extend through an arcuate slot 138 formed in lower mounting plate 18 and has its opposite ends retained in apertures 140 and 142 formed respectively in cam plates 106 and 108, thereby interconnecting cam plates 106 and 108 for synchronous pivotal movement on pivot pin 32 about second axis "B".

To provide means for causing idler gear 34 to move between its first and second positions in response to movement of handle 100, idler pin 36 is shown to extend through a guide slot 144 formed in outer idler plate 84, a cam slot 146 formed in outer cam plate 108, an aperture 148 formed in idler gear 34, a clearance slot 150 formed in lower mounting plate 18, a cam slot 152 formed in inner cam plate 106, and a guide slot 154 formed in inner idler plate 78. Thus, idler gear 34 is supported for rotation on idler pin 36 and movement between its first and second positions along a path defined by idler pin 36 moving within clearance slot 150. A washer 156 is secured to the end of idler pin 36 adjacent to inner idler plate 78. Preferably, cam slots 146 and 152 are aligned and have identical contours such that synchronous rotation of cam plates 106 and 108 about pivot pin 32 results in controlled movement of idler gear 34 between its first and second positions. In particular, each cam slot 146 and 152 has a lock segment 160 and a release segment 162. As will be detailed, lock segment 160 functions as a lost-motion slot with respect to idler pin 36 for maintaining idler gear 34 in its first position when latching mechanism 24 is in its latched mode. In contrast, release segment 162 functions to cause movement of idler pin 36 for moving idler gear 34 between its first and second positions when latching mechanism 24 is shifted between its latched and unlatched modes. Additionally, a pair of springs 164 and 170 are provided for normally urging latching mechanism 24 into its latched mode. Extension spring 164 includes a first end 165 hooked in a spring aperture 166 formed in outer idler plate 84 and a second end 167 hooked to a segment 168 of pivot pin 32. Torsion spring 170 includes a first end 171 hooked in a slot 172 formed in outer cam plate 108 and a second end 173 hooked in an aperture 174 formed in fixture plate 38.

When it is desired to adjust the reclined position of seatback 14, recline actuator mechanism 26 is actuated by rotating handle 100 in a clockwise direction. Such rotation of handle 100 causes interconnected idler plates 78 and 84 to also pivot in a clockwise direction about hinge pin 22, in opposition to the biasing exerted thereon by extension spring 164, from the non-actuated position of FIG. 1 to the actuated position of FIG. 4. Such rotation of idler plates 78 and 84 causes striker pin 102 to engage an edge surface 175 of outer cam plate 108 which, in turn, causes interconnected cam plates 106 and 108 to rotate in the counterclockwise direction about pivot pin 32, in opposition to the biasing exerted thereon by torsion spring 170, from the locked position of FIG. 1 to the released position of FIG. 4. Such rotation of cam plates 106 and 108 causes idler pin 36 to move within corresponding cam slots 152 and 146 from their lock segments 160 into their release segments 162. As noted, idler gear 34 is maintained in its first position when idler pin 36 travels within lock segments 160 of cam slots 152 and 146 during counterclockwise rotation of cam plates 106 and 108. Upon continued counterclockwise rotation of cam plates 106 and 108 toward the released position, idler pin 36 enters release segments 162 of cam slots 152 and 146, the contour of which forcibly urges idler pin 36 to move idler gear 34 from its first position to its second position, thereby shifting latching mechanism 24 from its latched mode into its unlatched mode. With idler plates 78 and 84 held by handle 100 in the actuated position, cam plates 106 and 108 are held in the released position which, in turn, holds idler gear 34 in its second position for permitting subsequent adjustment of the seatback reclined position of seatback 14.

Following selection of a desired reclined position, the seat occupant releases handle 100 which, due to the biasing of spring 164, causes handle 100 and idler plates 78 and 84 to rotate in a counterclockwise direction. Such counterclockwise rotation of idler plates 78 and 84 from the actuated position to the non-actuated position permits torsion spring 170 to forcibly rotate cam plates 106 and 108 in a clockwise direction from the released position to the locked position. In response to such rotation of cam plates 106 and 108, idler pin 36 moves from release segments 162 to lock segments 160 of cam slots 152 and 146 for moving idler gear 34 from its second position to its first position. Thus, release of handle 100 causes idler gear 34 from its second position to its first position. Thus, release of handle 100 causes move-ment of idler gear 34 from its second position to its first position for automatically shifting latching mechanism 24 back into its latched mode.

As an additional feature, the length of each lock segments 160 of cam slots 146 and 152 is selected to locate idler pin 36 in abutment against its terminal end when idler gear 34 is properly located in its first position whereat it is fully meshed with positioning gear 30 and quadrant 28. In addition, the length of lock segment 160 is selected to accommodate the possibility of the teeth of idler gear 34 temporarily hanging up on the teeth of positioning gear 30 when handle 100 is released. Thereafter, idler gear 34 will, due to the biasing of springs 164 and 170, move into complete meshed engagement with positioning gear 30 upon slight movement of seatback 14. Moreover, the contour of guide slots 144 and 154 is eccentric relative to hinge pin 22 such that they act to forcibly urge the teeth of idler gear 34 into meshed engagement with the teeth of positioning gear 30 and quadrant 28 when idler gear 34 is in its first position for minimizing backlash (i.e. chucking) of seatback 14 relative to seat bottom 12. Furthermore, since positioning gear 30 is constantly meshed with quadrant 28, pivotal movement of upper mounting plate 20 causes positioning gear 30 to rotate on pivot pin 32. As such, lock detents 176 and 178 formed on the edge of positioning gear 30 are engageable with stop pin 52 when seatback 14 is in either of its full forward or full recline positions, thereby providing a redundant seatback stop feature. It is also contemplated that recline actuator mechanism 26 could incorporate a power-operated device in substitution actuated and actuated positions in response to activation of an electrical switch or a device equivalent thereto. Finally, it is contemplated that various modifications could be made to seat recliner 10 such as, for example, the use of only the outer idler plate 84 and outer cam plate 108 for controlling movement of idler gear 34.

The foregoing discussion discloses and describes exemplary embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A seat recliner for adjusting the angular position of a seatback relative to a seat bottom, comprising:

a first member adapted to be secured to the seat bottom;

a second member adapted to be secured to the seatback and supported for pivotal movement relative to said first member;

a latching mechanism operable in a latched mode for inhibiting pivotal movement of said second member relative to said first member and in an unlatched mode for permitting such pivotal movement of said second member, said latching mechanism having a first gear non-rotatably fixed to said second member, a second gear rotatably supported on said first member and meshed with said first gear, and a third gear meshed with said first gear; and a recline actuator mechanism for shifting said latching mechanism from said latched mode into said unlatched mode in response to movement of said third gear from a first position to a second position, said third gear being meshed with said second gear in said first position and unmeshed with said second gear in said second position.

2. The seat recliner of claim 1 wherein said recline actuator mechanism includes a biasing spring for normally urging said third gear toward said first position.

3. The seat recliner of claim 1 further comprising a stop pin extending from said first member into a guide slot formed in said second member, the length of said guide slot defining the limits of pivotal movement of said second member relative to said first member upon engagement of said stop pin with the ends of said guide slot.

4. The seat recliner of claim 1 further comprising a pin extending from said first member which is engageable with a first detent formed in said second gear when said second member is pivoted in a first direction.

5. The seat recliner of claim 1 wherein said third gear is rotatably supported on a pin, and wherein said recline actuator mechanism includes a cam plate pivotally supported on said first member and having a cam slot through which said pin extends, said cam slot is configured such that movement of said cam plate between a locked position and a released position causes said pin to move in said cam slot for moving said third gear between said first position and said second position.

6. The seat recliner of claim 5 further comprising a biasing spring for urging said cam plate toward said locked position.

7. The seat recliner of claim 5 wherein said pin also extends through a guide slot formed in said first member.

8. The seat recliner of claim 5 wherein said recline actuator mechanism further includes an idler plate pivotally supported on said first member and which is engageable with said cam plate such that movement of said idler plate from a non-actuated position to an actuated position causes said cam plate to move from said locked position to said released position.

9. The seat recliner of claim 8 further comprising a handle fixed to said idler plate for moving said idler plate from said non-actuated position to said actuated position.

10. The seat recliner of claim 8 further comprising a first biasing spring for urging said idler plate toward said non-actuated position and a second biasing spring for urging said cam plate toward said locked position.

11. The seat recliner of claim 10 wherein said pin extends through a guide aperture in said idler plate.

12. The seat recliner of claim 8 further including a fixture plate secured to said first member with said first, second and third gears located between said fixture plate and said first member.

13. The seat recliner of claim 12 wherein said cam plate is positioned between said fixture plate and said idler plate.

14. A seat recliner for adjusting the angular position of a seatback relative to a seat bottom, comprising:

a first member adapted to be secured to the seat bottom and rotatably supporting a first gear;

a second member adapted to be secured to the seatback and supported for pivotal movement relative to said first member, said second member non-rotatably supporting a second gear which is meshed with said first gear;

a third gear meshed with said second gear;

a cam plate supporting said third gear, said cam plate is supported on said first member for movement between a locked position whereat said third gear is in a first position meshed with said first gear and a released position whereat said third gear is in a second position unmeshed from said first gear; and an actuator for moving said cam plate between said locked and released positions.

15. The seat recliner of claim 14 wherein said third gear is rotatably supported on a pin retained in a slot formed in said cam plate, said slot is contoured to move said third gear between said first and second positions in response to movement of said cam plate between said locked and released positions.

16. The seat recliner of claim 15 further comprising a biasing spring for urging said cam plate toward said locked position.

17. The seat recliner of claim 15 further including an idler plate pivotally supported from said first member, said idler plate is engageable with said cam plate such that movement of said idler plate from a non-actuated position to an actuated position causes said cam plate to move from said locked position to said released position.

18. The seat recliner of claim 17 further comprising a handle fixed to said idler plate for moving said idler plate from said non-actuated position to said actuated position.

19. A seat assembly comprising:

a seat bottom;

a seatback; and a recliner for adjusting the angular position of said seatback relative to said seat bottom, said recliner including a first member secured to said seat bottom, a second member secured to said seatback and supported for pivotal movement relative to said first member, a latching mechanism operable in a latched mode for inhibiting pivotal movement of said second member relative to said first member and in an unlatched mode for permitting such pivotal movement of said second member, said latching mechanism having a first gear non-rotatably fixed to said second member, a second gear rotatably supported on said first member and meshed with said first gear, and a third gear meshed with said first gear, and a recline actuator mechanism for shifting said latching mechanism from said latched mode into said unlatched mode in response to movement of said third gear from a first position to a second position, said third gear being meshed with said second gear in said first position and unmeshed with said second gear in said second position.

20. The seat assembly of claim 19 wherein said recline actuator mechanism includes a biasing spring for normally urging said third gear toward said first position.

21. The seat assembly of claim 19 further comprising a stop pin extending from said first member into a guide slot formed in said second member, the length of said guide slot defining the limits of pivotal movement of said second member relative to said first member upon engagement of said stop pin with the ends of said guide slot.

22. The seat assembly of claim 19 further comprising a pin extending from said first member which is engageable in a first detent formed in said second gear when said second member is pivoted in a first direction.

23. The seat assembly of claim 19 wherein said third gear is rotatably supported on a pin, and wherein said recline actuator mechanism includes a cam plate pivotally supported on said first member and having a cam slot through which said pin extends, said cam slot is configured such that movement of said cam plate between a locked position and a released position causes said pin to move in said cam slot for moving said third gear between said first position and said second position.

24. The seat assembly of claim 23 further comprising a biasing member for urging said cam plate toward said locked position.

25. The seat assembly of claim 23 wherein said recline actuator mechanism includes an idler plate pivotably supported on said first member and which is engageable with said cam plate, whereby movement of said idler plate from a non-actuated position to an actuated position causes said cam plate to move from said locked position to said released position.

26. The seat assembly of claim 25 wherein said idler plate is connected to said pin, and further comprising a first biasing spring for urging said idler plate toward said non-actuated position and a second biasing spring for urging said cam plate toward said locked position.

27. The seat assembly of claim 25 further comprising a handle fixed to said idler plate for moving said idler plate from said non-actuated position to said actuated position.

* * * * *